Dec. 11, 1928.  1,695,214
N. E. E. SÖRENSEN
CHANGE SPEED GEAR FOR MOTOR CARS OR OTHER POWER PROPELLED VEHICLES
Filed Feb. 24, 1928  2 Sheets-Sheet 2
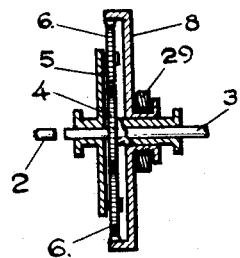
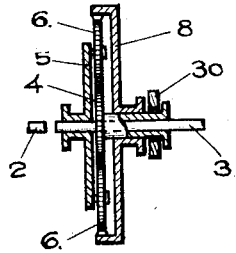
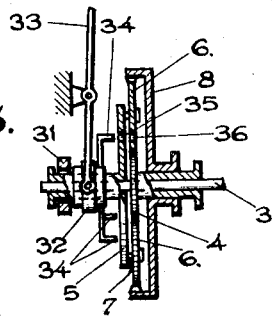
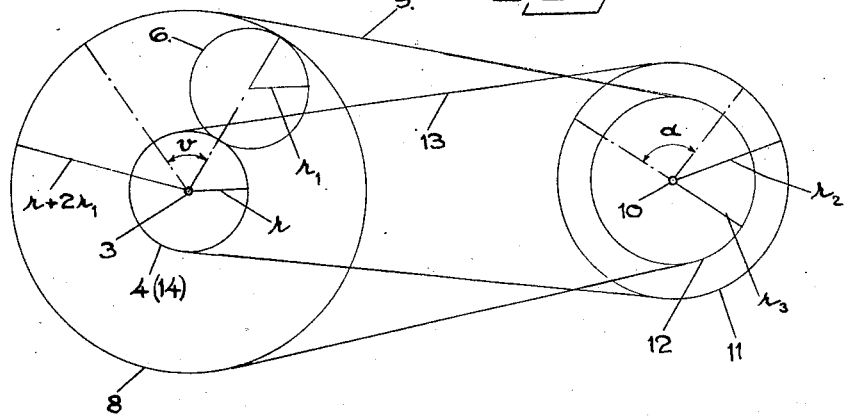
INVENTOR.
N. E. E. Sörensen
BY Marks & Clerk
ATTORNEYS.

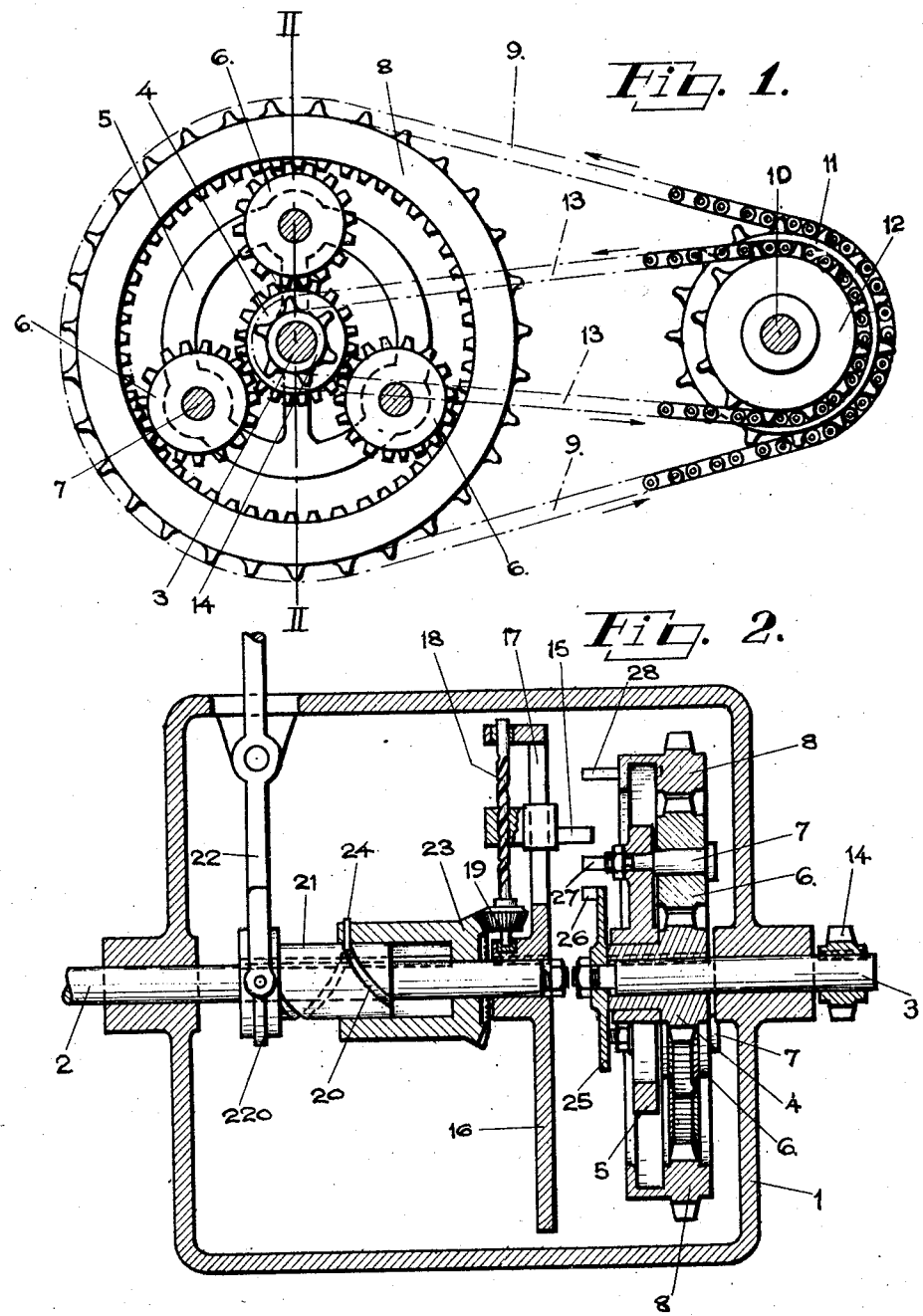

Patented Dec. 11, 1928.

1,695,214

UNITED STATES PATENT OFFICE.

NIELS EDVARD EINAR SÖRENSEN, OF SAFVENAS, GOTTENBORG, SWEDEN.

CHANGE-SPEED GEAR FOR MOTOR CARS OR OTHER POWER-PROPELLED VEHICLES.

Application filed February 24, 1928. Serial No. 256,700, and in Germany September 16, 1927.

The present invention refers to change speed gear for motor cars, motor cycles, ordinary cycles or similar appliances. One object of the invention is to provide a speed gear of a contracted design as a substitute for the bulky and heavy ordinary gear boxes.

Another object of my invention is to provide means for obtaining a plurality of different speeds with a minimum of parts in the gear.

A further object is a change speed gear which provides a reversal of motion and gives to such reversed motion various speeds.

A further object of my invention is a change speed gear where destructive shocks when changing speed are effectively removed so that the speed changing occurs smoothly and easily.

My invention can be carried out in various modifications, and though I have described and illustrated herein a special embodiment with some modifications, I am anxious to point out, that I do not want to limit myself to such embodiments, but my invention can be carried out in a plurality of other ways within the scope of the claims, and the embodiments here described and shown are to be considered exclusively as examples only.

In the accompanying drawings

Fig. 1 is a side elevation view of the change speed gear of a rather elementary design, Fig. 2 shows an axial section on the line II—II in Fig. 1.

Figs. 3, 4 and 5 show diagrammatically modifications by which the gear can be designed to develop two further speeds in the ahead direction as well as two speeds in reverse direction, Fig. 6 is a geometrical illustration of the main parts adapted to facilitate the understanding of the calculation of the various speeds.

On the drawings, similar or like parts are designated with the same references in all the figures. The gear as a whole has the appearance of a planetary gearing operating a counter shaft. Within the casing 1 there are mounted two co-axial shafts 2 and 3 the first mentioned of which is the driving shaft, for instance the engine shaft of a motor or the pedal shaft of cycle or the like, and the shaft 3 a free going shaft on which the gear wheels are mounted. The driven counter shaft is designated with 10.

The centre or proper sun wheel 4 is keyed on the shaft 3, and a disc 5 is rotatably mounted on the shaft 3 outside the hub of said gear 4, so that the disc can revolve freely about the shaft 3. Said disc is provided with a number of planetary pinions 6, in the drawing three such pinions are shown, each rotatable about a pin 7 attached to the disc 5, and all the pinions meshing with the toothed outer rim of the sun wheel 4. Encircling the planetary pinions 6 is rotatably mounted a ring or orbit gear 8 with interior teeth meshing with the planetary pinions 6. The outer rim of the orbit gear 8 is designed as a sprocket wheel which operates a sprocket wheel 11 on the counter shaft 10 by means of a chain 9. Another sprocket wheel 12 on the counter shaft 10 cooperates by means of a chain 13 with a sprocket wheel 14 keyed on the shaft 3. The wheels 11 and 12 can either be keyed on the shaft 10 or freely mounted thereon and provided to be temporarily connected therewith, the one or the other or both simultaneously. Such a loose connection is provided especially for the modifications shown in Figs. 3–5, which are more particularly described hereinafter. Clutches suited for said purpose can be of arbitrary design and are not shown in the drawings, as they can be readily understood by anybody skilled in the art.

The means to perform the changes in speed are shown diagrammatically in Figs. 2–5 inclusive, and I want to declare, that what is shown therein are to be regarded exclusively as diagrammatical examples for the purpose only to materialize how the different speeds can be obtained. The drawing must not be reckoned as a definite design for the practical performance of the invention.

The speed changing means comprises a finger 15 one end of which is formed as a nut and is movable along a rotary worm 18 within a radial slot 17 in a disc 16 keyed to the driving shaft 2. The radial displacement of the finger 15 within the slot 17 is performed by revolving the screw without permitting it to move axially, and said revolving is achieved by a conical pinion 19 meshing with a conical wheel 23 that is rotatably mounted on the shaft 2. A sleeve 21 the outer cylindrical surface of which is provided with a helical groove 20 in which a pin 24 in the hub of the wheel 23 meshes is also mounted on the shaft 2. The sleeve 21 can be axially displaced along but not rotated about the shaft 2 by a change gear lever 22 cooperating with a ring 220 in a peripheral groove in the sleeve 21 as is generally known from similar mechanical appliances. The movement of the sleeve 21 causes rotation of the gear 23 in both directions according to the direction of movement of the sleeve 21. When the wheel 23 is thus turned the pinion 19 transmits said movement to the worm 18 whereby the finger 15 is displaced in the slot, in the disc 16 in all momentary angular positions of said disc. The revolving of the wheel 23 is performed by sliding the sleeve 21 along the shaft 2 whereby the helical groove 20 causes the pin 24 and therewith the wheel 23 to turn through an angle corresponding to the pitch of the helical groove 20 and the axial displacement of sleeve 21.

The sprocket wheel 14, a disc 25 and the central sun wheel 4 are rigidly connected with the shaft 3, so that they establish a unit. The disc 25, the disc 5 and the orbit gear 8 are each provided with a lug 26, 27, 28 respectively which lugs project radially in such a way that each of them will make contact with the finger 15, if said finger becomes displaced radially so far that its momentary distance from the centre of the shaft 2 corresponds to the position of the one or the other of the lugs 26, 27, 28. If for instance the finger 15 is positioned at the same height as the lug 26 of the sun wheel disc 25 said finger when the disc 16 revolves with the shaft 2 contacts with the lug 26 and carries this lug and the disc 25 with the result that the sun wheel 4 and sprocket wheel 14 become coupled to the shaft 2 and are caused to follow the revolving thereof thus transmitting said motion in a reduced degree to the shaft 10 by the chain 13 and sprocket wheel 12. If the finger 15 is positioned in front of the lug 27 the motion of the disc 16 will be transmitted to the disc 5, and if the finger 15 is made to cooperate with the lug 28 the outer orbit gear 8 with the chain 9 and the sprocket wheel 11 will be caused to transmit the rotation of disc 16 and shaft 2 in an enlarged degree to the shaft 10. Hereinafter the result and object of these different coupling positions will be clearly described.

As mentioned before all the figures are very diagrammatic, hence the actual design of the parts which transmit the motion from the shaft 2 to shaft 10 through the sun gear 4 and the orbit gear 8, and the planetary pinion disc 5 is in no means restricted to the embodiments here described and shown. Figures 3, 4 and 5 are still more diagrammatical than Figs. 1 and 2, and will now be described. All these figures show brake arrangements which are nondispensable, if one wants to get more than three different speeds with one and the same specimen of the device. Fig. 3 illustrates a brake 29 to keep the orbit gear 8 stationary. Fig. 4 shows a similar brake 30 for the sun gear 4 and Fig. 5 shows an adequate arrangement 31 for the pinion disc 5. All the brakes can be designed in any arbitrary way so as to suit the present conditions as well as the standpoint of the industry.

In Fig. 5 there is further shown an arrangement by which the planetary pinions 6 can be fixed to the disc 5, so that they cannot revolve about their pins 7. The object of this arrangement will be described hereinafter, and here I will only describe how it can be materialized. A sleeve 32 mounted on the shaft 3 can be slid axially by means of a lever 33 as for instance is the case with sleeve 21 and lever 22. The sleeve 32 is provided with three perpendicularly projecting fingers 34 which by sliding the sleeve to the right can be inserted each through horizontal holes 35 in the disc 5 and, if then the pinions 6 are in position, through holes 36 in them the pinions become locked to the disc 5 and prevented from rotating on their pins 7. The consequence is that, when the disc 5 is revolved by cooperation between finger 15 and lug 27, the pinions 6 are meshing with the sun gear 4 and the orbit gear 8, thus constituting a rigid clutch between said two gears causing them to rotate with the disc 5. The same result, viz that the sun gears 4 and the orbit gear 8 and the disc 5 be rotated simultaneously will, of course, occur if the one or the other of the gears 4 or 8 is made to revolve by cooperation between finger 15 and the respective lug 26 or 28.

Fig. 6 has for its object to demonstrate the geometric relation between the parts. In the figure the angles $v$ and $\alpha$ respectively indicate the simultaneous angular movement of shaft 2 and shaft 10, and the lengths of the various radii are designated with $r$ for the sun gear 4, and with $r_1$ for the planetary pinions 6 and consequently $r+2r_1$ for the outer orbit gear 8, further $r_2$ for the sprocket wheel 11 and $r_3$ for the sprocket wheel 12. In order to simplify the matter I have supposed that the sprocket wheel 14 has the same radius $r$ as the corresponding sun gear 4, and that the radius $r+2r_1$ of the orbit gear 8 is the same as the radius of the sprocket wheel rim of said sun wheel.

I will for the first treat the most simple embodiment as shown in Figs. 1 and 2 whereby the following cases will be ascertained.

1. By means of the lever 22 the sleeve 21 is slid so far, that the helical slit 20 and pin 24 turn the wheel 23 to such an angle that the worm 18 moves the finger 15 in cooperation with the lug 26 whereby the gear 4 and sprocket wheel 14 are made to revolve with the driving shaft 2, thus transmitting the motion thereof to the shaft 10 by means of chain 13 and sprocket wheel 12.

In a unit of time the angular displacement of shaft 10 will be $$\alpha_1 = v\frac{r}{r_2}$$

If now the two sprocket wheels 11 and 12 are both keyed to the shaft 10, the torsion will be transmitted to the orbit gear 8 by the chain 9. That has the only result that gear 8, pinions 6 and disc 5 are brought to an idle revolving condition without any influence on the motion of the shaft 10.

2. If the lever 22 is swung in the opposite direction, the sleeve 20 will be turned in such a way that the worm 18 places the finger 15 in cooperation with lug 28 on the orbit gear 8, whereby the motion of shaft 2 is transmitted to shaft 10 by aid of chain 9 and sprocket wheel 11, and the angular displacement in a unit of time reads $$\alpha_2 = v\frac{r + 2r_1}{r_3}$$

Also in this case it is immaterial whether the wheel 12 is keyed to shaft 10 as that will simply bring forth an idle revolving of sun wheel 11 and planetary disc 5.

3. In its intermediate position finger 15 cooperates with lug 27 whereby the planetary disc 5 is made to revolve with the shaft 2, so that the pinions 6 roll along the two gears 4 and 8. According to the difference in the radii of said two wheels they will revolve but with relatively different speeds, transmitting each its speed to wheels 12 and 11 respectively. If now the two sprocket wheels 11 and 12 are both keyed to the shaft 10 a revolving speed will be imparted to said shaft which is composed by the relative motion of gears 4 and 8, and the angular displacement per unit of time will be $$\alpha_3 = v \cdot 2 \cdot \frac{r_3}{r_2} \cdot \frac{r + r_1}{r_2 + r_3}$$

Already the simplest form of the gearing will thus create three different speeds, viz:
1. With the sun gear 4 as sole operative: the slowest speed,
2. With the orbit gear 8 as sole operative: the fastest speed, and
3. With the planetary disc 5 operative: an intermediate speed the magnitude of which depends upon the relative proportions between the radii $r$ and $r_1$, which can be arbitrarily chosen for each specimen of gearing according to the predetermined use thereof.

A practical design of the gear has shown it desirable to make the largest speed some ten times the smallest one and the relation between the largest and the intermediate speeds some 3 : 1, viz $$10\alpha_1 = 3\alpha_3 = \alpha_2$$

I will now treat the cases where any one of the three parts of the gearing is made stationary when the two others are allowed to revolve. In these cases the two sprocket wheels 11 and 12 cannot be rigidly fixed to the shaft 10, but they must be provided with brakes or similar means, so that the one or the other wheel can be released to revolve free on said shaft, or in any other way its transmitting ability be made idle.

4. In Fig. 3 the brake 29 is made operative and prevents the revolving of the orbit gear 8, the sprocket wheel 11 is released from the shaft 10 and the finger 15 is brought in cooperation with the lug 27 of the planetary pinion disc 5, so that said disc revolves with the driving shaft 2. The motion of the shaft 2 now will be transmitted from the disc 5 by the pinions 6 to the centre sun wheel 4 but with a rolling of the pinions 6 along the stationary outer orbit gear 8, thus imparting to the movable sun wheel 4 a complicated speed, which is transmitted to the shaft 10 by chain 13 and sprocket wheel 12, so that the angular displacement per unit of time becomes $$\alpha_4 = v \cdot 2 \cdot \frac{r + r_1}{r_2}$$

5. If the brake 30 holds the sun gear 4 stationary, the sprocket wheel 12 is released from the shaft 10 and finger 15 brought to cooperate still with the lug 27 of the planetary pinion disc 5 the pinions 6 will roll along the orbit gear 4 and act upon the orbit gear 8 and impart to said gear a speed regulated by the relative proportions of pinions and wheel and transmitted to shaft 10 by means of chain 9 and sprocket wheel 11. The angle of torsion now will be $$\alpha_5 = v \cdot 2 \cdot \frac{r + 2r_1}{r_3}$$

The brakes 29 and 30 in combination with the releasing means for the sprocket wheels 11 and 12 have thus made it possible to add two further speeds for the ahead drive.

The brake 31 in Fig. 5 brings forth the reverse drive which also can be given two different speeds subject to the momentary position of the clutches which control the cooperation between wheels, 11, 12, and shaft 10. If for instance wheel 11 is released, the pinions 6, revolving about their pins 7, which now are kept stationary by the brake 31, will transmit the motion of the orbit gear 8, revolved from shaft 2 by the cooperation between finger 15 and lug 28, in the reverse direction to the sun gear 4 and through wheel 14, chain 13 and wheel 12 to the shaft 10. The same will occur with another speed, if wheel 12 is released and gear 4 revolved positively from shaft 2 by means of finger 15 and lug 26 whereby the pinions 6 will transmit the reverse motion to the outer sun wheel 8, chain 9 and wheel 11 to the shaft 10.

The arrangement in Fig. 5 can be used as a substitute for the whole speed change mechanism 17 to 23 inclusive, and 26, 28, if the two sprocket wheels 11, 12 are provided with such releasing clutches as mentioned above in combination with the cases 4 and 5. If the shaft 10 is to revolve with a speed depending on the orbit gear 8, the sprocket wheel 12 will be released, the fingers 34 brought in cooperation with the holes 35, 36 in disc 5 and pinions 6 respectively, and finger 15 brought to operate the lug 28 of orbit gear 8. The pinions 6 now are prevented to revolve and the motion is transmitted to gears 11 and 10 exclusively from the gear 8. If gear 11 is released and finger 15 caused to operate lug 26 of sun gear 4 when the fingers 34 lock the pinions 6 to the disc 5, solely the wheel 4 is in position to transmit the motion from shaft 2 to shaft 10. When the gears 11 and 12 are both locked to the shaft 10, the fingers 34 removed from holes 35 and 36 and finger 15 made to operate the lug 27 on the planetary pinion disc 5, the mechanism will operate as described above in case 3.

Of course, all the toothed wheels and sprocket wheels can be substituted by friction wheels respectively belt or line pulleys as also the sprocket wheels and chains be substituted by toothed wheels.

Also it is not necessary, that the two gears 8 and 4 are of different diameter but they can be of the same diameter provided that their transmission to shaft 10 is of different value, so that the same number of speeds can be obtained as mentioned above. It is evident that in the last mentioned case these gears must be disposed side by side and the planetary pinions must be given such a width or divided in two coaxial wheels of the same or different diameter, that they mesh with the two gears.

Also the planetary disc 5 can be designed as a sprocket wheel, a toothed wheel, a belt pulley, et cetera, and made to cooperate with a similar wheel on shaft 10 that can be a substitute for one of the wheels 11, 12 and their corresponding chains 9, 13 respectively.

The brakes 29, 30, 31 can also be manipulated such that they only reduce in any desired degree the speed of the respective gears 4 or 8 or disc 5 without completely stopping the motion thereof, whereby further variations in the speed can be achieved.

Finally I can use the shaft 10 as the driving shaft and the shaft 2 as the driven shaft without destroying the material point of the invention. When applied on ordinary cycles the clutches for wheels 11 and 12 can be designed as free wheel hub gear.

What I claim as new and want to protect by Letters Patent is—

1. In a change speed gear, a driving shaft, two gear wheels, a countershaft operable by each of said gear wheels by separate transmitting means having different ratios of gearing, said gear wheels forming two coaxial gear wheels in a planetary gearing, planetary pinions cooperating simultaneously with both the first mentioned gear wheels, and selective means to make operative at will either of the said transmitting means or to simultaneously make operative both of said transmitting means thereby imparting three different speeds from the driving shaft to the counter shaft.

2. In a change speed gear a driving shaft, a planetary gear comprising two coaxial gear wheels, planetary pinions cooperating simultaneously with both the said gear wheels, a rotary member supporting said planetary pinions, a counter shaft operable by each of said gear wheels, two separate transmitting means having different ratios of gearing each connecting one of said gear wheels to said counter-shaft, said planetary gears mounted to revolve independent of the driving shaft, selective means to temporarily connect with the driving shaft at will one or the other of said first mentioned gear wheels or the planetary pinion supporting member thereby causing the counter shaft to be operated either by one transmitting means or the other or simultaneously by both of said transmitting means and thus imparting to the counter shaft three different speeds.

3. In a change speed gear, a driving shaft, a planetary gearing rotatable independently of said driving shaft, said planetary gear comprising two coaxial gear wheels, cooperating planetary pinions supported by a rotary member, separate power transmitting means for each of said gear wheels, a counter shaft operable by each of said two transmitting means, and selective means provided to temporarily connect with the driving shaft at will one or the other of said gear wheels or only the planetary pinion supporting member.

4. In a change speed gear, a driving shaft and a driven shaft, a planetary gear rotatable independently of said shafts, comprising two gear wheels in said planetary gear and planetary pinions supported by a freely rotatable member, two separate power transmitting means between the driving shaft and driven shaft each having different ratios of gearing and operated by the planetary gear, selective means to connect the driving shaft with the power transmitting means either through one or the other of said gear wheels or through two gear wheels together.

5. In a change speed gear, a driving shaft and a driven shaft, a planetary gear comprising two gear wheels and interposed planetary pinions, a supporting member for the planetary pinions, selective means to connect at will either the one gear wheel or the other gear wheel or the supporting member for the planetary pinions with the driving shaft, two power transmitting means between the driving shaft and the driven shaft, independent of each other and having different gear ratios, each operatively connected to the planetary gearing and operated by the planetary gear in such a way, that depending on the momentary position of the selective connection between driving shaft and planetary gear either solely the one transmitting means or solely the other transmitting means or simultaneously both transmitting means are operative.

In testimony whereof I have affixed my signature.

NIELS EDVARD EINAR SÖRENSEN.